Aug. 10, 1948.  L. H. KAUPKE ET AL  2,446,878
TIER
Filed Nov. 21, 1942  5 Sheets-Sheet 1
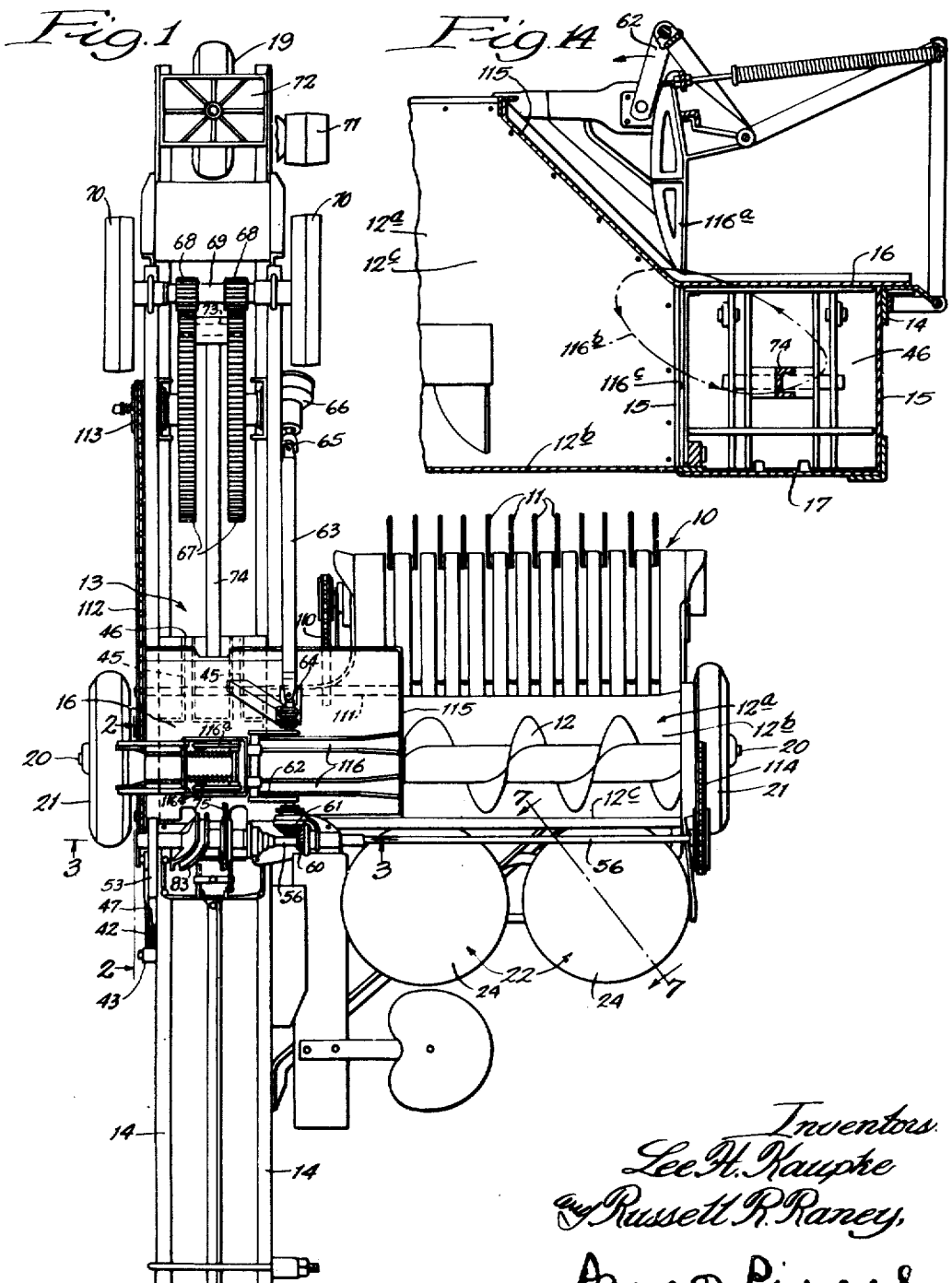
Inventors
Lee H. Kaupke
Russell R. Raney,
By Paul O. Pippel
Attorney.

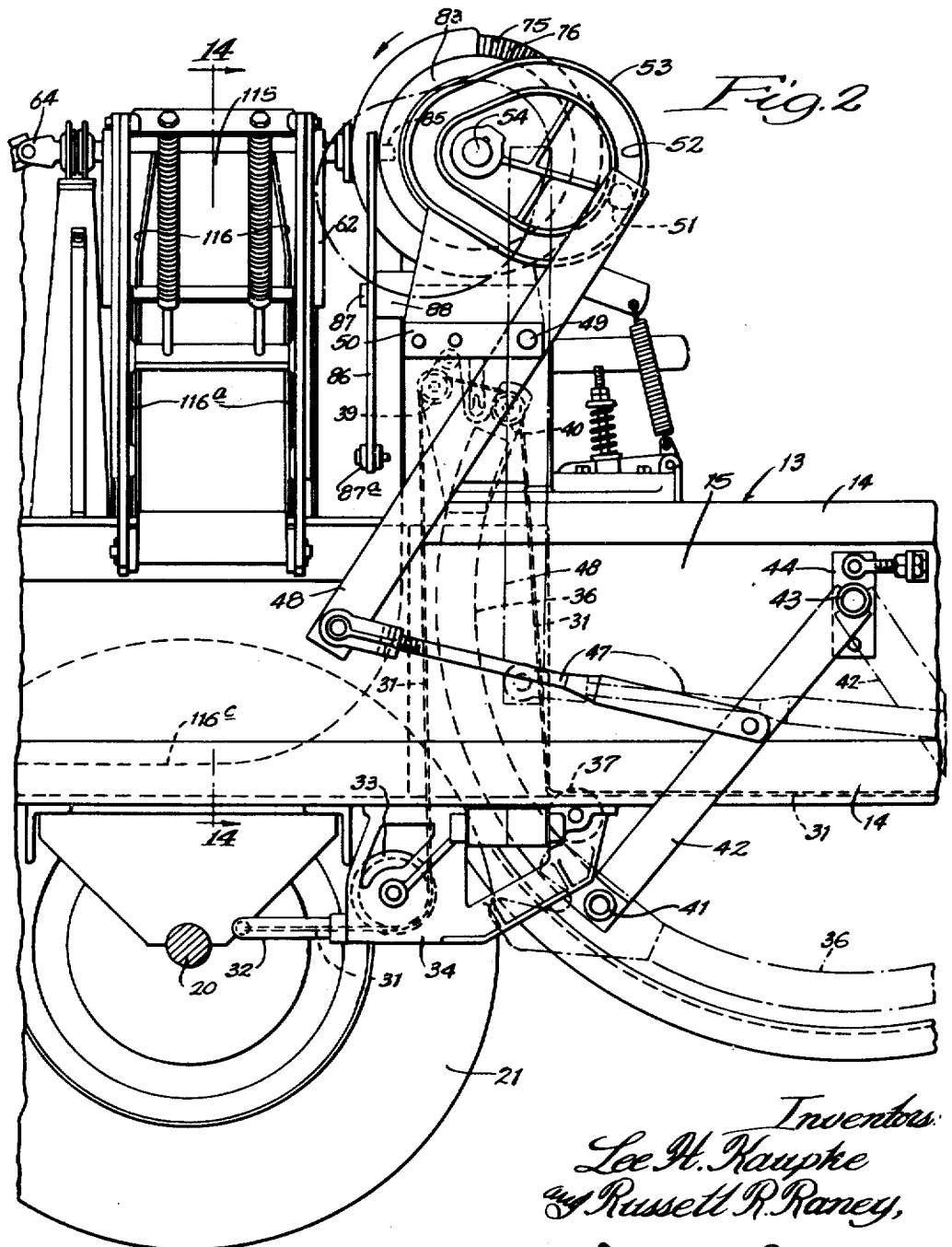

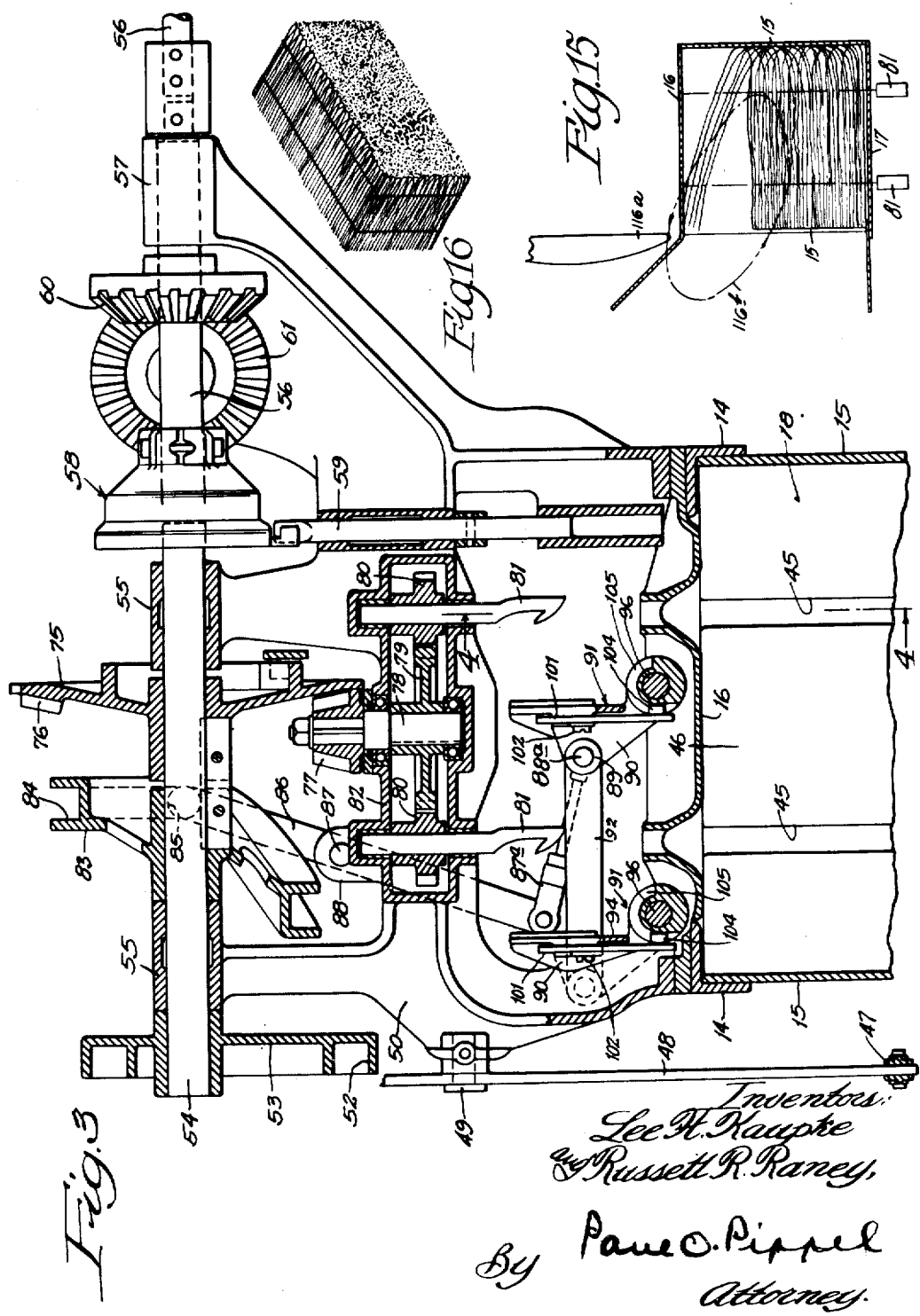

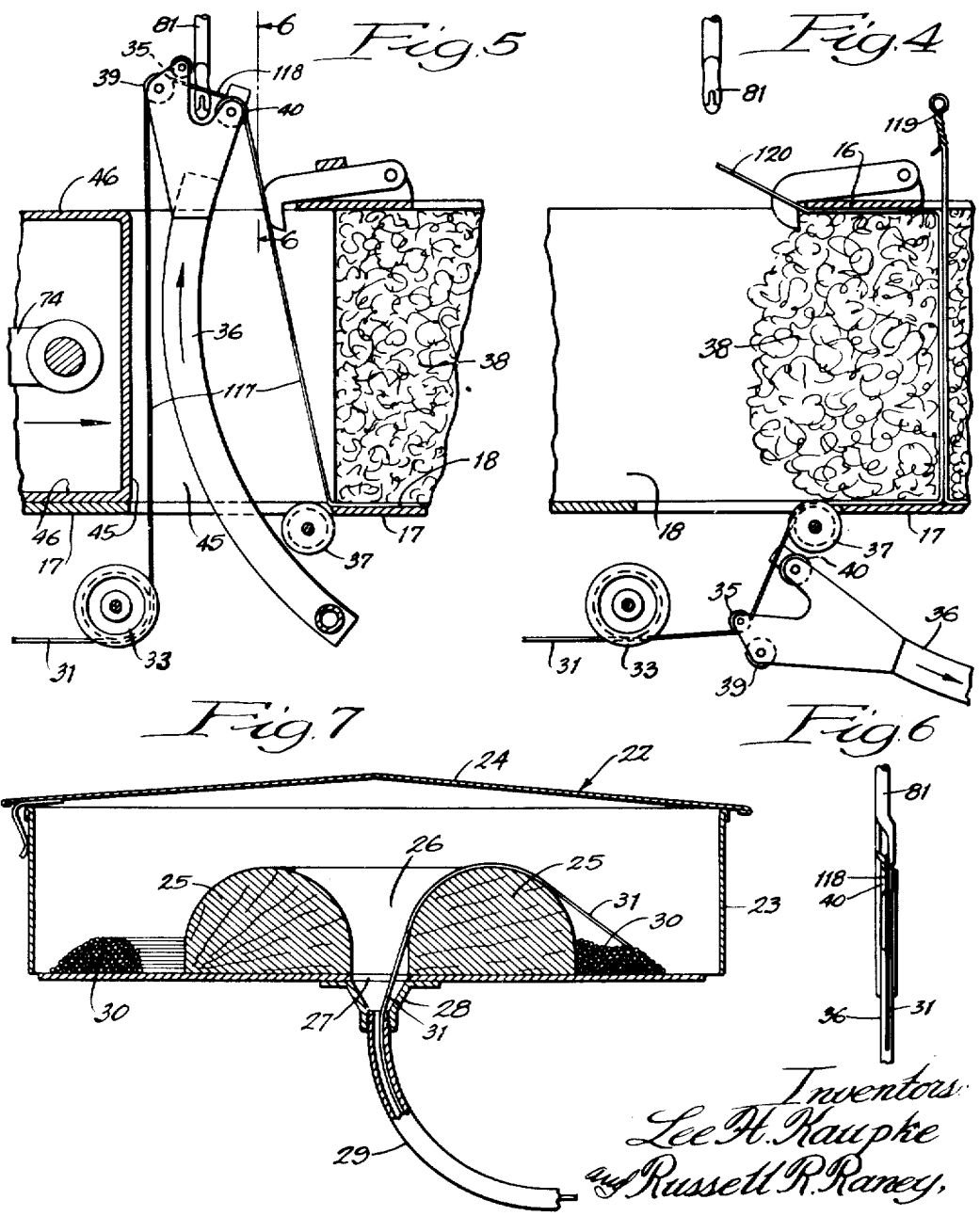

Aug. 10, 1948.  L. H. KAUPKE ET AL  2,446,878
TIER
Filed Nov. 21, 1942  5 Sheets-Sheet 5
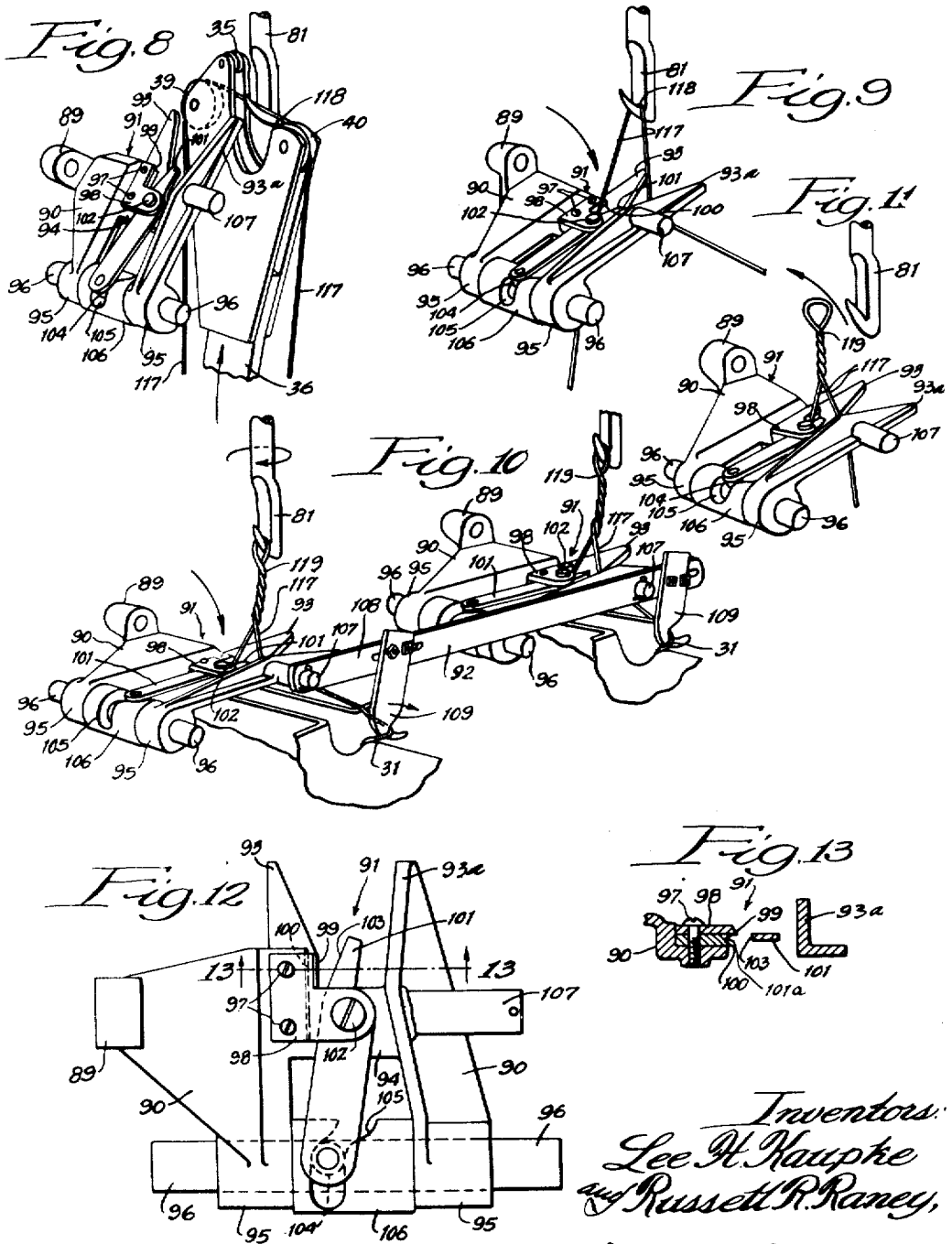

Patented Aug. 10, 1948

2,446,878

UNITED STATES PATENT OFFICE 2,446,878

TIER

Lee H. Kaupke and Russell R. Raney, La Grange, Ill., assignors to International Harvester Company, a corporation of New Jersey Application November 21, 1942, Serial No. 466,461

36 Claims. (Cl. 100—20)

This invention relates to a tyer construction. More specifically it relates to a bale tyer associated with a pick-up baler.

It has been known to provide pick-up balers with bale-tying mechanism. Generally pick-up balers are arranged so that the material picked up is fed into the baling chamber through the top thereof. Under certain circumstances it is more desirable to feed material into the side of the baling chamber, for, with this arrangement, the material to be baled need not be elevated so high. It has been discovered that the use of a bale-tying mechanism, which involves wire-feeding needles moved vertically across the baling chamber rather than horizontally thereof, makes possible the feeding of material to be baled into the baling chamber through a side opening therein. Thus, if a knife is secured to the baling plunger for shearing off the ends of material passing into the baling chamber by movement of the knife along the opening into the chamber, there is no interference between the knife and the wire-feeding needles. Furthermore, the arrangement of the tying mechanism, involving vertical feeding of the needles from the bottom of the baling chamber to the top thereof, permits a very advantageous positioning of the parts of the tying mechanism upon the top of the baling chamber.

An object of the present invention is to provide an improved tying mechanism.

A further object is the provision of a tying mechanism for use with a baler.

Another object is to provide a mechanism for forming a twisted loop in the end of a wire.

A still further object is the provision of an improved tying mechanism for use with a pick-up baler.

Another object is to provide an improved arrangement for tying mechanism associated with a baler in which material is fed into the side of a baling chamber.

Still another object is to provide an improved arrangement for a tying mechanism associated with a pick-up baler, of which the baling chamber has a side feed opening.

Other objects will appear from the disclosure.

According to the present invention, there is associated with a pick-up baler, in which material picked up is fed through an opening in the baling chamber in a vertical side wall thereof, a tying mechanism involving feeding needles moved vertically upwardly through a baling chamber. The tying mechanism includes means for forming a twisted loop in the end of a baling wire, which means is positioned on top of the baling chamber. There is provided adjacent the twisted loop-former a severing and cutting means for the wire, which, upon completion of the twisted loop, moves away from the loop-former to disengage the loop therefrom and thereafter severs the wire and clamps one severed end thereof.

In the drawings:

Figure 1 is a plan view of a pick-up baler to which is applied the novel tying mechanism of the present invention;

Figure 2 is a sectional view taken along the line 2—2 of Figure 1;

Figure 3 is a sectional view taken along the line 3—3 of Figure 1;

Figure 4 is a sectional view taken along the line 4—4 of Figure 3;

Figure 5 is a sectional view similar to Figure 4 but showing certain parts in a different position;

Figure 6 is a view taken along the line 6—6 of Figure 5;

Figure 7 is a sectional view taken along the line 7—7 of Figure 1;

Figures 8, 9, 10 and 11 show the tying mechanism of the present invention in various positions;

Figure 12 is a plan view of the severing and cutting means associated with the tying mechanism of the present invention;

Figure 13 is a sectional view taken along the line 13—13 of Figure 12;

Figure 14 is a sectional view taken on the line 14—14 of Figure 2;

Figure 15 is a sectional view similar to Figure 14 but with certain parts omitted; and Figure 16 is a perspective view of a bale.

Figure 1 shows in plan a pick-up baler, which comprises a pick-up cylinder 10 having tines 11 thereon, an auger 12 positioned rearwardly of the pick-up cylinder for feeding transversely material picked up by the cylinder along a platform 12$^a$ having a horizontal bottom 12$^b$ and a vertical back 12$^c$, and a baling unit 13. The baler unit 13 includes corner angle members 14, side walls 15, and top 16, and bottom 17, which form a baling chamber 18. The forward end of the baling unit is carried by a steerable front truck 19, and an axle 20 supported on wheels 21 carries the mid-point of the baling framework 13, and the pick-up cylinder 10, and the auger 12.

Positioned to the rear of the platform 12ª is a pair of containers 22. As seen in Figure 7, each container 22 comprises a can 23 and a detachable cover 24. Positioned within the can 23 is an annulus 25 formed of wood and having a rounded upper surface. An opening 26 in the annulus is directly over an opening 27 in the container 23, which communicates through a flange member 28 with a pipe 29. In each can 23 is positioned a coil of wire 30 which is unwound, as indicated, in a strand of wire 31, which goes over the curved top of the annulus 25, down through the opening 26 therein, the opening 27, the can 23, the flange member 28, and the pipe 29. The strand of wire 31 is passed through the pipe 29 transversely across to the outer side of the baling unit 13 and into a pipe 32, which may be formed either as an extension of the pipe 29 or may be separated therefrom, so that a portion of the strand 31 is exposed as it passes from the pipe 29 to the pipe 32. The strand 31, as it passes out of the pipe 32, contacts the lower side of a roller 33 journaled in a casting 34 carried at the under side of the baler unit 13. As seen in Figure 4, the strand of wire 31 passes beneath a roller 35 journaled on a needle 36 and then passes over a roller 37 journaled at the under side of the baler unit 13. The strand 31 passes along the inside of the bottom 17 of the baling chamber 18 for a short distance, then vertically upwardly across the baling chamber 18 to the top 16 and along the top 16, and then out of the top. The strand 31 is retained within the baling chamber 18, as shown in Figure 4, by a mass 38 constituting a partially formed bale. The needle 36 includes, beside the roller 35, rollers 39 and 40. As shown in Figures 2 and 5, the needle is curved and is secured upon a tube 41 passing beneath the baling unit 13, which is in turn secured to an arm 42 pivoted at 43 on a bracket 44 secured to the outer side wall 15. Figures 4 and 5 illustrate only one needle 36, but it is to be understood that there is a pair of needles 36 secured to the tube 41 in laterally spaced relation so as to be spaced laterally of the baling chamber 18 corresponding to vertical slots 45 formed in baling plunger 46. Thus, the needles may be passed vertically upwardly through the baling chamber 18 and through the slots 45 in the baling plunger 46 for a purpose later to be described.

The arm 42 is connected by an adjustable connecting rod 47 to the lower end of a lever 48 pivoted at a mid-point, as indicated at 49, on a casting 50 positioned over the baling chamber 18 and extending upwardly therefrom. The upper end of the lever 48 has a follower 51 which rides in a groove 52 of a cam 53 secured to a drive shaft 54. The shaft 54 is journaled in spaced bearings 55 formed as portions of the casting 50. Extending in alinement with the shaft 54 is a shaft 56 which is journaled in a bearing bracket 57 formed as an extension of the casting 50. The shafts 54 and 56 are connected to one another by a clutch 58 which is normally held inoperative so that there is no driving connection between the shafts. Actuation of the clutch 58 to connect the shafts for driving is effected by downward movement of a member 59. The details of the clutch 58 and its operation by the member 59 are not shown, since they are well known in the field of agricultural implements and form no part of the present invention. It is sufficient to state that, upon downward movement of the member 59, the clutch 58 is conditioned to establish a driving connection between the shaft 56 and the shaft 54 upon arrival of the shaft 56 at a certain predetermined angular position. A bevel gear 60 is secured upon the shaft 56 and is engaged by a bevel gear 61 secured to a crank structure 62 which is in turn secured to a shaft 63 by a universal joint 64 connected in turn by universal joint 65 with a gear-box 66. Through the gear-box 66 and universal joint 65 the shaft 63 is connected to a gear 67 meshing with a gear 68 secured to a shaft 69 carrying at its extremities belt pulleys 70. Positioned adjacent one belt pulley 70 is a belt pulley 71 which is adapted to drive the said one belt pulley 70 and to be driven by an engine, not shown, carried on a support 72 positioned over the steerable front truck 19. The shaft 69 carries two gears 68 which mesh with two gears 67 connected to one another by a pin 73 to which is connected a connecting rod 74 for the baling plunger 46.

Secured to the shaft 54 is a mutilated gear 75 having teeth 76 only throughout a small portion of its periphery. The teeth 76 are to mesh with a gear 77 secured to a shaft 78, to which is secured a gear 79 meshing with a pair of gears 80 secured to twisting hooks 81. The twisting hooks 81 and the shaft 78 are journaled in a housing 82 formed as part of the casting 50, which housing encloses the gears 79 and 80. Secured to the shaft 54 is a cam 83 which has a cam track 84 that is curved so as to extend somewhat along the shaft 54 as well as around it. A follower 85 engages the cam track 84 and is secured to the upper end of a lever 86 journaled at a mid-point indicated at 87 on a portion 88 of the casting 50. The lower end of the lever 86 is connected to an adjustable connecting rod 87ª. The connecting rod 87ª is connected to a pin 88ª which is mounted in a bearing 89 formed on a member 90 forming part of an associated severing and clamping means 91. A link 92 connects the member 90 with a similar member 90 of another associated severing and clamping means 91. As seen in Figure 12, the member 90 is composed of a pair of spaced opposed portions 93 and 93ª joined by a connecting part 94. The member 90 also includes spaced bearing portions 95 which are journaled upon a pin 96 secured to the top 16 of the baler unit 13. Secured to the member 90 by screws 97 is a part 98 having a cutting edge 99. A clamping part 100 having a groove 101ª is secured between the member 90 and the part 98 so as to space the part 98 from the member 90. A movable member 101 is pivotally mounted on the under side of the member 98 by a screw 102 and has a cutting edge 103 adapted to cooperate with the cutting edge 99 for severing a wire and with the clamping part 100 for clamping the wire after severing. One end of the movable member 101 carries a follower 104 engaging a cam groove 105 of a sleeve 106 secured to the pin 96. The member 90 of each associated severing and clamping means carries a boss 107, and extending between these bosses and pivotally connected thereto is the link 92 extending between the members 90 and beyond the right-hand member 90 as viewed in Figure 10. Hooks 108 are secured to the link 92 immediately to the right of the two associated cutting and severing means 91.

The pick-up cylinder 10 is driven by a sprocket chain 110 driven by a cross shaft 111 driven by a chain 112 at the outer side of the baling unit 13, driven by a sprocket 113 secured to the gear 67. The auger 12 is driven by a chain 114 which is driven by the shaft 56.

In operation of the pick-up baler of Figure 1, material picked up by the pick-up cylinder 10 is moved transversely toward the baling unit 13 by the auger 12, which has an inner end open and unsupported directly under a shield 115 having slots 116, as seen in Figure 14. Packing fingers or raking fingers 116ª secured to the crank structure 62 and moving along the path indicated by a broken line 116ᵇ pass through the slots 116 in the shield 115. This construction is more completely shown and claimed in the copending application of Crumb et al., Serial No. 466,460, filed November 21, 1942, but the action of the arms is to sweep material from the open end of the auger 12 through an opening 116ᶜ in one vertical side 15 of the baling chamber 18. The plunger 46 reciprocating within the baling chamber 18 compresses material, as indicated at 38 in Figure 4. The baling wire 31 extends along the bottom 17 of the baling chamber 18, across the baling chamber at the rear of the mass 38, and then along the top 16.

When the mass 38 has grown to sufficient size for a bale, the member 59 (Figure 3) is pulled down to actuate the clutch 58, and the clutch is so constructed as to become effective upon arrival of the shaft 56 at a predetermined angular position to establish a driving connection between the shaft 56 and the shaft 54. This predetermined angular position of the shaft 56 is reached when the plunger 46 has nearly reached the forwardmost position of Figure 5. Thus the shaft 56 causes the shaft 54 to rotate and with it the cam 53. As the cam 53 rotates, the needles 36 are moved from the position beneath the baling chamber 18, as shown in Figure 4, vertically upwardly through the baling chamber 18 and through the slots 45 in the plunger 46, as shown in Figure 5. The wire 31, trained across the rollers 39 and 40 of the needle 36, is carried across the baling chamber 18 in the form of a bight having side-by-side portions 117 and a connecting portion 118. As shown in Figure 8, the connecting portion 118 is brought over the hook 81 and into engagement therewith. Then the needle 36 is withdrawn, moving downwardly through the baling chamber 18. In the meantime, the associated cutting and severing means 91, by virtue of the rotation of the cam 83 and the consequent pivoting of the lever 86 and movement of the connecting rod 87ª, will have moved from the nearly vertical position of Figure 8 to the somewhat more horizontal positions of Figures 9 and 10, in which it engages the bight of the wire 31 now somewhat changed in shape with the side-by-side portions 117 close together and the connecting portion 118 somewhat reduced in size.

The movable member 101 of the associated severing and cutting means 91 will be inserted between the side-by-side portions 117 of the bight, and the opposed portions 93 and 93a of the stationary member 90 will be positioned at the outer sides of the portions 117 of the bight. By this time the shaft 54 will have rotated the mutilated gear 75 sufficiently to bring the teeth 76 into engagement with the gear 77, so that the twisting hook 81 will rotate, as indicated in Figure 10, so as to form a twisted loop 119 from the bight. The members 101 and 90 of the associated severing and clamping means will prevent rotation of the side-by-side portions 117 of the bight and will thus assure formation of the twisted loop 119. Upon completion of the twisted loop 119, the teeth 76 on the mutilated gear 75 will have moved out of engagement with the gear 77 so that the hook 81 will stop rotating. By this time, the cam 83 will have rotated sufficiently to cause the associated severing and clamping means 91 to have moved from the almost horizontal position of Figure 10 to the somewhat more inclined position of Figure 11, thus lifting the twisted loop 119 from the twisting hook 81. The severing and clamping means 91 continues to move from the position in Figure 11 upwardly to the position of Figure 8, and the movement of the follower 104 secured to the member 101 in the cam track 105 of the stationary sleeve 106 will cause pivoting of the member 101 with respect to the member 90 so as to cause the cutting edge 103 to engage the cutting edge 99 to sever the wire 31 adjacent the twisted loop 119 and the member 101 and to engage the clamping part 100 to clamp in the groove 101ª in the part 100 the severed end of the section of the wire 31 not having the twisted loop 119. With the wire severed, the twisted loop 119 may be tied to a free end of the wire by insertion of the free end of wire through the loop and twisting. After the loop 119 has been formed, the wire has been severed, and the twisted loop 119 has been connected to the free end of the wire section of which it forms a part to complete a bale, more material is fed into the baling chamber 18 and the wire is extended about the baling chamber, as shown in Figure 4. A free end 120 extending outwardly, as shown in Figure 4, is the end which is clamped between the movable member 101 and the clamping part 100. This end is held clamped until a new bale is to be formed, at which time the associated severing and clamping means 91 is pivoted downwardly toward the twisting hook 81. The movement of the follower 104 in the cam track 105 in the stationary sleeve 106 causes the member 101 to move away from the clamping part 100 to release the clamped end 120. The hook 109 will, upon movement of the severing and clamping means 91 into horizontal position, engage the wire 31 to pull the clamped end 120 free of the severing and cutting means 91. Otherwise the clamped end 120 might tend to stick in this means even though released from being clamped.

The movement of material through the opening 16ᶜ in the vertical side 15 of the baling chamber 18 by means of the packing fingers or raking arms 116ª forms a part of the present invention only insofar as there is a special cooperation between the feeding through the opening in the vertical side of the baling chamber and the application of a baling wire along the top and bottom of the bale and vertically along the ends of the bale between the top and bottom, by means of the vertically moving needles 36. The movement of the material to be baled by the raking arms 116ª through the opening 116ᶜ in the vertical side 15 of the baling chamber 18 causes the pieces of the material, such as stems and stalks of hay when this is the material, to extend transversely and horizontally of the baling chamber and to be folded into U-shape, as shown in Figure 15. Since the baling wire extends lengthwise of the baling chamber along the bottom and the top of the bale and vertically across the ends of the bale, all portions of the wire extend transversely of the stalks, stems, and strands forming the bale, as shown in Figure 16, and thus there is a very good securement of the bale by the baling wire. This is brought about by the novel combination of the horizontal feeding of material to be baled through a feed opening in a vertical side of the baling chamber and the vertical feeding across the bale chamber of a tying means for the bale.

It is, of course, known to feed material to be baled through a feed opening in the top of a baling chamber and to tie the formed bale by a wire extending along the vertical sides of the bale and transversely horizontally across the ends thereof. This method brings about the same beneficial results insofar as concerns arrangement of the alined and folded stalks, stems, and strands at right angles to the parts of the baling wire. However, the horizontal feeding of the material through a vertical side of the baling chamber presents another beneficial result not obtained by vertical feeding through the top of a baling chamber.

With the vertical feeding of the loose ends cut off by the knife on the plunger fall to the bottom of the bale chamber after return of the plunger from its compression stroke. A new charge of material is moved vertically into the baling chamber on top of the loose ends at the bottom of the chamber. The loose ends stay on the bottom and never commingle sufficiently with the main body of material to form part of the bale, and the baling wires passed horizontally along the sides and across the ends of the bale never bend the loose ends to the bale. Thus these loose ends are wasted.

With horizontal feeding the loose ends cut off by the knife on the plunger fall along side the baling chamber on the platform. They are swept into the baling chamber by the new charge of material and commingle with the alined and folded stems, stalks, and strands of the new charge of material so as to become an integral part of the bale. Moreover, the baling wires extend along the bottom of the bale so as to insure that the loose ends be bound as part of the bale.

It will be apparent from the foregoing description that a new and novel tying mechanism has been provided. One feature of novelty in the mechanism lies in the use of severing and clamping means for removing the twisted loop from the twisting hook. This severing and clamping means is positioned adjacent the twisting hook on a pivotal mounting so that, when it is shifted about its pivot away from the twisting hook, it removes the twisted loop from the twisting hook and the same shifting movement causes actuation of the severing and cutting means, so that the wire is cut adjacent the twisted loop and the severed end of the wire section not having the loop is clamped. The wire section is held clamped in the severing and clamping means until a new loop is to be formed, at which time the severing and clamping means shift back toward the twisting hook to engage the bight of wire passed across the hook. At the same time the clamping means is released so that the clamped end of the wire section is freed.

Another novel feature lies in the provision of a hook and a link carrying the hook and connected between two pairs of severing and clamping means so that, upon shifting of each severing and clamping means toward a twisting hook, the hook carried by the link moves with respect to the severing and clamping means to remove the unclamped end of the wire section positively from the severing and clamping means.

Another novel feature lies in the arrangement of the tying mechanism so that the baling wire is fed vertically through the baling chamber by a needle which passes from the bottom of the baling chamber upwardly therethrough to the top thereof. With this arrangement it is possible to provide a knife on the vertical side of the plunger operating in the baling chamber without interference with the needle. The knife on the vertical side of the baling plunger moves across a feed opening in the vertical side of the baling chamber. The arrangement of the tying mechanism for vertical feeding of the needle upwardly through the baling chamber also makes possible the positioning of a twisting hook and associated mechanisms, such as a severing and clamping means, upon the top of the baling chamber.

Another novel feature of the invention is the feeding of wire to the baling chamber from a coil held in a receptacle upwardly and over an annulus positioned within the coil in the receptacle and downwardly through the annulus and the bottom of the receptacle. Further, it is novel to position this wire receptacle upon a pick-up baler behind the transverse conveyer leading from the pick-up device to the baling chamber.

In various claims the term "strand" is used as a generic term for tying material such as wire, cord, rope, thread, string, twine, straps, etc.

The intention is to limit the invention only within the scope of the appended claims.

What is claimed is:

1. In combination, means for forming an intermediate part of a strand into a bight composed of two side-by-side portions and a connecting portion, rotatable means for engaging the bight adjacent the connecting portion for rotating the bight to form a twisted loop therefrom, and means subsequent to the twisting for severing the strand adjacent the loop into two pieces and for clamping the cut end of the piece not having the loop.

2. In combination, means for forming an intermediate part of a strand into a bight composed of two side-by-side portions and a connecting portion, rotatable means for engaging the bight adjacent the connecting portion for rotating the bight to form a twisted loop therefrom, and means subsequent to the twisting for severing the strand adjacent the loop into two pieces and for clamping the cut end of the piece not having the loop, said last-mentioned means including a part for holding the side-by-side portions of the bight against twisting to insure formation of the twisted loop from the bight by the rotation of the rotatable means engaging the bight adjacent the connecting portion.

3. In combination, means for forming an intermediate part of a strand into a bight composed of two side-by-side portions and a connecting portion, rotatable means for engaging the bight adjacent the connecting portion and for rotating the bight to form a twisted loop therefrom, a stationary member having opposed portions positioned at the outer sides of the side-by-side portions of the bight, a movable member mounted on the stationary member and extending between the side-by-side portions of the bight for preventing twisting of the side-by-side portions at that point to insure formation of the twisted loop by rotation of the rotatable means, and means for moving the movable part to sever by coaction with the stationary part the strand into two sections adjacent the twisted loop and to clamp between itself and the stationary part the section of the loop not carrying the twisted loop.

4. In combination, means for forming an intermediate part of a strand into a bight composed of two side-by-side portions and a connecting portion, rotatable means for engaging the bight adjacent the connecting portion and for rotating the bight to form a twisted loop therefrom, associated clamping and severing means engageable with the side-by-side portions of the bight to prevent twisting to insure formation of the twisted loop by rotation of the rotatable means, means for bodily moving the associated clamping and severing means to dissociate the twisted loop from the rotatable means, and means for actuating the associated clamping and severing means to sever the strand into two pieces adjacent the twisted loop and to clamp the piece not having the twisted loop.

5. In combination, means for forming an intermediate part of a strand into a bight composed of two side-by-side portions and a connecting portion, a rotatable hook insertable into the bight at the connecting portion for rotating the bight to form a twisted loop therefrom, a part insertable into the bight at a point spaced from the connecting portion to prevent rotation of the bight at that point to insure formation of the twisted loop by the rotatable hook, and means for shifting the part to remove the twisted loop from the rotatable hook.

6. In combination, means for forming an intermediate part of a strand into a bight composed of two side-by-side portions and a connecting portion, a rotatable hook insertable into the bight at the connecting portion for rotating the bight to form a twisted loop therefrom, cooperating parts engageable with the bight at a point spaced from the connecting portion with one part extending into the bight and the other part outside the same to prevent rotation of the bight at that point to insure formation of the twisted loop by rotation of the rotatable hook, means for shifting the cooperating parts jointly to remove the twisted loop from the hook, and means for moving one part with respect to the other to sever the strand into two sections adjacent the loop and to clamp the severed end of the section not having the twisted loop.

7. In combination, means for forming an intermediate part of a strand into a bight composed of two side-by-side portions and a connecting portion, a rotatable hook insertable into the bight at the connecting portion for rotating the bight to form a twisted loop therefrom, a stationary part having opposed portions at the outer sides of the bight, a movable part mounted on the stationary part and insertable into the bight at a point spaced from the connecting portion for preventing rotation of the bight at that point to insure formation of the twisted loop, means for bodily shifting the stationary and movable parts to disengage the twisted loop from the rotatable hook, and means for moving the movable part with respect to the stationary part to sever the strand into two sections adjacent the twisted loop and to clamp the severed end of the section not having the twisted loop.

8. In combination, a rotatable hook, means for forming an intermediate part of a strand into a bight having two side-by-side portions and a connecting portion and for engaging the bight over the rotatable hook, a stationary member having spaced opposed portions, a movable member mounted on the stationary member so as to extend between the spaced portions, means for bodily shifting the members to position the opposed portions of the stationary member on the outer sides of the side-by-side portions of the bight and the movable member into the bight, means for rotating the rotatable hook to form a twisted loop in the bight, means for bodily shifting the members to remove the twisted loop from the hook, and means for moving the movable member with respect to the stationary member to sever the strand into two sections adjacent the twisted loop and to clamp the severed end of the section not having the twisted loop.

9. In combination, a rotatable hook, means for forming an intermediate part of a strand into a bight having two side-by-side portions and a connecting portion and for engaging the bight over the rotatable hook, cutting and clamping means, means shiftably mounting the same, means for shifting the cutting and clamping means toward the hook to insert a part thereof between the side-by-side portions of the bight, means for rotating the rotatable hook to form a twisted loop in the bight, means for shifting the clamping and cutting means away from the hook to remove the twisted loop from the hook, and means responsive to shifting of the cutting and clamping means away from the hook to actuate the same to sever the strand into two sections adjacent the twisted loop and to clamp the severed end of the section not having the twisted loop.

10. In combination, a frame, a twisting hook, means rotatably mounting the twisting hook upon the frame, means for forming from a strand a bight having two side-by-side portions and a connecting portion and for engaging the bight upon the hook, a clamping and cutting means comprising a first member having spaced opposed side portions and a second member movably mounted upon the first member, means pivotally mounting the first member upon the frame for joint movement of the members toward and away from the twisting hook, means for pivotally moving the members toward the twisting hook to insert the second member between the side-by-side portions of the bight and to position the spaced side portions of the first member on the outer sides of the side-by-side portions of the bight, means for rotating the twisting hook to form a twisted loop on the bight, means for pivotally moving the members away from the hook to remove the twisted loop from the hook, and means responsive to movement of the members away from the hook for moving the second member with respect to the first member to sever the strand into two sections adjacent the twisted loop and to clamp the severed end of the section not having the twisted loop.

11. In the combination specified in claim 10, the last-mentioned means in claim 10 comprising a cam member fixed adjacent the pivot of the first member of the severing and clamping means and a follower secured to the second member engaging said cam member to shift the second member upon pivoting of the severing and clamping means.

12. In the combination specified in claim 10, the last-mentioned means in claim 10 comprising a member fixed adjacent the pivot of the first member of the severing and clamping means and having a control groove and a follower secured to the first member and engaging the control groove to shift the second member upon pivoting of the severing and clamping means.

13. In a machine for forming a twisted loop in a strand extending from a source of supply along one side of a bale, along one end, and along the other side, comprising a needle movable from the said one side of the bale across the bale to the other side to form from the portion of the strand at one side of the bale a bight extending across the bale, a rotatable twisting hook positioned at the said other side of the bale to engage the bight, means for rotating the twisting hook to form a twisted loop in the bight, severing and clamping means for severing the strand into two sections adjacent the twisted loop and for clamping the severed end of the end of the section not having the twisted loop, the combination therewith, of means for shifting the severing and clamping means toward the twisting hook before forming of the loop for engaging the bight to prevent rotation of a portion thereof to insure formation of the twisted loop by the twisting hook, and means for shifting the severing and clamping means away from the hook after forming of the loop to remove the loop from the hook.

14. The combination specified in claim 13 and further including means responsive to shifting of the severing and clamping means away from the hook to actuate the severing and clamping means.

15. In combination, means forming a horizontally extending baling chamber, means for feeding from the bottom of the baling chamber vertically thereacross to the top thereof in the form of a bight a baling strand extending from a source along the bottom of the chamber vertically across the end and along the top, a rotatable hook positioned at the top of the baling chamber for forming a twisted loop, severing and clamping means positioned at the top of the baling chamber, means for shifting the severing and clamping means toward the twisting hook before forming of the twisted loop for engaging the bight to prevent rotation thereof to assure formation of the twisted loop by the twisting hook, means for shifting the severing and clamping means away from the hook after forming of the twisted loop to disengage the twisted loop from the hook, and means responsive to shifting of the severing and clamping means away from the hook for actuating the severing and clamping means to sever the strand into two sections adjacent the twisted loop and to clamp the severed end of the section not having the twisted loop.

16. In combination, means for forming an intermediate part of a strand into a bight composed of two side-by-side portions and a connecting portion, a rotatable hook for forming a twisted loop in the connecting portion of the bight, severing and clamping means positioned adjacent the hook, means for shifting the severing and clamping means to disengage the twisted loop from the hook, and means for actuating the severing and clamping means to cause the same to sever the strand adjacent the loop into two sections and to clamp one section of the strand after formation of the twisted loop.

17. In combination, means for forming an intermediate part of a strand into a bight composed of two side-by-side portions and a connecting portion, a rotatable hook for forming a twisted loop in the connecting portion of the bight, severing and clamping means positioned adjacent the hook, means for shifting the severing means to disengage the twisted loop from the hook, and means for actuating the severing means subsequent to forming the twisted loop to cause the same to sever the strand adjacent the hook into two sections.

18. In combination, a baling chamber, a baling strand extending along opposite sides and across the end thereof, means for bringing a portion of the strand across the chamber from one side to the opposite side, means for forming a loop in the portion of the strand brought across the chamber, severing and clamping means positioned adjacent the loop-forming means, means for moving the severing and clamping means away from the loop-forming means for releasing the loop from engagement therewith, and means for actuating the severing and clamping means to sever the strand into two sections and to clamp one section.

19. In combination, a baling chamber, a baling strand extending along opposite sides and across the end thereof, means for bringing a portion of the strand across the chamber from one side to the opposite side, means for forming a loop in the portion of the strand brought across the chamber, severing and clamping means positioned adjacent the loop-forming means, means for moving the severing means away from the loop-forming means for releasing the loop from engagement therewith, and means for actuating the severing means to sever the strand into two sections.

20. In a baler having a baling chamber and means for extending a strand around a bale being formed therein, a former for forming a tying portion in said strand, severing and clamping means positioned adjacent the former, means for moving the severing and clamping means with respect to the former to remove the tying portion of the strand from the former, and means for actuating the severing and clamping means to sever the strand into two sections adjacent the tying portion and to clamp one section.

21. In a baler having a baling chamber and means for extending a strand around a bale being formed therein, a former for forming a tying portion in said strand, severing means positioned adjacent the former, means for moving the severing means with respect to the former to remove the tying portion of the strand from the former, and means for actuating the severing means to sever the strand into two sections adjacent the tying portion.

22. In combination, a horizontally extending baling chamber having a side opening, means feeding material to be baled through the side opening into the baling chamber, means for feeding from the bottom of the baling chamber vertically thereacross to the top thereof a baling strand extending along the top and bottom of the baling chamber and vertically thereacross at a point spaced from the point where the said means moves the strand vertically across the chamber, a former positioned at the top of the baling chamber adjacent the point where the strand is fed vertically across the chamber by the feeding means for forming a tying portion on the strand, severing and clamping means positioned adjacent the former, means for moving the severing and clamping means with respect to the former to remove the tying portion of the strand from the former, and means for actuating the severing and clamping means to sever the strand into two sections and to clamp one section of the strand.

23. In combination, a horizontally extending baling chamber having a side opening, means feeding material to be baled through the side opening into the baling chamber, means for feeding from the bottom of the bale chamber vertically thereacross to the top thereof a baling strand extending along the top and bottom of the baling chamber and vertically thereacross at a point spaced from the point where the said means moves the strand vertically across the chamber, a former positioned at the top of the baling chamber adjacent the point where the strand is fed vertically across the chamber by the feeding means for forming a tying portion on the strand, severing means positioned adjacent the former, means for moving the severing means with respect to the former to remove the tying portion of the strand from the former, and means for actuating the severing means to sever the strand into two sections.

24. In a baler, a horizontally extending baling chamber having a side opening, means for feeding material to be baled through the side opening into the baling chamber, means for extending a strand along the top and bottom of the chamber and vertically across the chamber between the top and bottom at spaced points, a former for forming a tying portion in said stand, severing and clamping means positioned adjacent the former, means for arcuately swinging the severing and clamping means with respect to the former to remove the tying portion of the strand from the former, and means for actuating the severing and clamping means to sever the strand into two sections adjacent the tying portion and to clamp on section.

25. A baler, a horizontally extending baling chamber having a side opening, means for feeding material to be baled through the side opening into the baling chamber, means for placing a strand along the top and bottom of the chamber and vertically across the chamber between the top and bottom at spaced points, a former for forming a twisted loop in a bight in one end of the strand, severing means positioned adjacent the former, means for moving the severing means with respect to the former to remove the tying portion of the strand from the former, and means for actuating the severing means to sever the strand into two sections adjacent the twisted loop.

26. In combination, a supporting framework, means forming a horizontally extending baling chamber having a side feed opening, means mounting the aforesaid means upon the framework, a driving shaft positioned over the baling chamber in spaced relation thereto and extending transversely of the length of the baling chamber, means rotatably mounting the driving shaft upon the framework, a gear secured to the driving shaft, a first cam secured to the shaft and shaped to provide reciprocal movement along the shaft, a second cam secured to the shaft and shaped to provide reciprocal movement toward and away from the shaft, a needle pivotally mounted upon the framework for feeding from the bottom of the baling chamber vertically thereacross to the top thereof in the form of a bight a baling strand extending from a source of supply along the bottom of the baling chamber and vertically across the baling chamber at a point spaced from the point where the needle feeds the strand across the baling chamber and along the top of the baling chamber, follower means connected with the needle and engaging the second cam for moving the needle vertically across the baling chamber, a rotatable twisting hook positioned at the top of the baling chamber for forming a twisted loop in the bight, means connecting the twisting hook and the gear for rotating the twisting hook, severing and clamping means pivotally mounted on the framework at the top of the baling chamber, follower means connected with the severing and clamping means and engaging the first cam for moving the severing and clamping means toward the twisting hook to cause the severing and clamping means to engage the bight to assure formation of the twisted loop by the twisting hook and for moving the severing and clamping means away from the hook to disengage the twisted loop from the hook, and means for actuating the severing and clamping means to sever the strand into two sections adjacent the twisted loop and to clamp the severed end of the section not having the twisted loop.

27. In the combination specified in claim 26, the means actuating the severing and clamping means being responsive to movement of the clamping and severing means away from the twisting hook.

28. In the combination specified in claim 26, the severing and clamping means being composed of a first member pivoted on the framework and having spaced opposed portions, a second member pivotally mounted upon the first member and having a follower portion, and a stationary part mounted upon the pivot axis of the first part and having a cam groove engaging the follower portion of the second member, whereby the spaced opposed portions of the first member are positioned on opposite sides of the bight, and the second member is inserted into the bight to prevent rotation of the bight during formation of a twisted loop therein, and movement of the member away from the hook removes the twisted loop from the hook and causes the cam groove of the stationary part to move the second member to sever the strand adjacent the loop into two sections and to clamp the severed end of the section not having the loop.

29. In combination, means forming a baling chamber, means for feeding across the chamber from one side to the opposite side in the form of a bight a baling strand extending along the said one side and the said opposite side and across the chamber at a point spaced from where the means feeds the baling strand across the chamber, means positioned at the said opposite side of the baling chamber for forming a twisted loop in the bight, severing and clamping means, means for shifting the severing and clamping means in one direction to sever the strand adjacent the loop into two sections and to clamp the severed end of the section, means for shifting the severing and clamping means in the opposite direction for unclamping the severed end of the strand therefrom, and means connected with the severing and clamping means so as to be movable with respect thereto upon movement thereof in the said opposite direction for positively removing the unclamped severed end of the strand section from the severing and clamping means.

30. In combination, means forming a baling chamber, means for feeding across the chamber from one side to the opposite side in the form of a bight a baling strand extending along the said one side and the said opposite side and across the chamber at a point spaced from where the means feeds the baling strand across the chamber, means positioned at the said opposite side of the baling chamber for forming a twisted loop in the bight, means for severing the strand adjacent the twisted loop into two sections, clamping means, means for bodily shifting the clamping means in one direction for clamping the severed end of the section not having the twisted loop, means for bodily shifting the clamping means in the opposite direction for unclamping the severed end, and means connected with the clamping means so as to be movable with respect thereto upon movement thereof in the said opposite direction for positively removing the unclamped severed end of the strand section from the clamping means.

31. In combination, means forming a baling chamber, means for feeding across the chamber from one side to the opposite side in the form of a bight a baling strand extending along the said one side and the said opposite side and across the chamber at a point spaced from where the means feeds the baling strand across the chamber, means positioned at the said opposite side of the baling chamber for forming a twisted loop in the bight, means for severing the strand adjacent the twisted loop into two sections, clamping means, means for clamping the severed end of the section not having the twisted loop, means for unclamping the severed end, and means connected with the clamping means so as to be movable with respect thereto upon unclamping for positively removing the unclamped severed end of the strand section from the clamping means.

32. In combination, means forming a baling chamber, means for feeding across the chamber from one side to the opposite side in the form of a bight a baling strand extending along the said one side and the said opposite side and across the chamber at a point spaced from where the means feeds the baling strand across the chamber, means positioned at the said opposite side of the baling chamber for forming a twisted loop in the bight, means for severing the strand adjacent the twisted loop into two sections, clamping means, means for clamping the severed end of the section not having the twisted loop, means for unclamping the severed end, and means connected with the clamping means for positively ejecting the severed end of the strand.

33. In combination, means forming a baling chamber, means for feeding across the chamber from one side to the opposite side in the form of a bight a baling strand extending along the said one side and the said opposite side and across the chamber at a point spaced from where the means feeds the baling strand across the chamber and positioned adjacent the loop-forming means, means for shifting the severing and clamping means in one direction with respect to the loop-forming means to disengage the twisted loop therefrom, means responsive to shifting of the severing and clamping means away from the loop-forming means to actuate the severing and clamping means to sever the strand adjacent the loop into two sections and to clamp the severed end of the section not having the loop, means for shifting the clamping and severing means in the opposite direction with respect to the loop-forming means for unclamping the severed end of the said strand section, and means connected with the severing and clamping means so as to be movable with respect thereto upon shifting thereof in the said opposite direction with respect to the loop-forming means for positively removing the clamped severed end of the said strand section from the severing and clamping means.

34. In combination, means forming a baling chamber, means for feeding across the chamber from one side to the opposite side in the form of a bight a baling strand extending along the said one side and the said opposite side and across the chamber at a point spaced from where the means feeds the baling strand across the chamber, means positioned at the said opposite side of the baling chamber for forming a twisted loop in the bight, severing and clamping means, a twisting hook positioned at the said opposite side of the baling chamber for forming a twisted loop in the bight, severing and clamping means pivotally mounted adjacent the twisting hook so as to be movable toward and away from the twisting hook, means for pivoting the severing and clamping means away from the twisting hook to disengage the twisted loop therefrom, means responsive to said pivoting away from the twisting hook to actuate the severing and clamping means to sever the strand adjacent the loop into two sections and to clamp the section not having the loop, means for pivoting the severing and clamping means toward the twisting hook to unclamp the severed end of the said strand section, means pivoted on a pivot axis spaced from that of the severing and clamping means, a link connecting the severing and clamping means and the aforesaid pivoting means, and a hook mounted upon the link for positively removing the unclamped severed end of the said strand section upon pivoting of the severing and clamping means toward the twisting hook.

35. In combination, means forming a baling chamber, means for feeding at spaced points across the chamber from one side to the opposite side in the form of bights a pair of baling strands each extending along the said one side and the said opposite side and across the chamber at a point spaced from where the means feeds the baling strands across the chamber, a pair of spaced twisting hooks positioned at the said opposite side of the baling chamber for forming twisted loops in the bights, a pair of severing and clamping means each pivotally mounted adjacent a twisting hook so as to be movable thereto toward and away therefrom, means for pivoting the severing and clamping means away from the twisting hooks to disengage the twisted loops therefrom, means responsive to said pivoting away from the twisting hooks to actuate the pairs of severing and clamping means to sever the strands adjacent the loops each into two sections and to clamp the severed ends of the sections not having the twisted loops, means for pivoting the pairs of severing and clamping means toward the twisting hooks for unclamping the severed ends of the said strand sections, a link connected between the pair of severing and clamping means, and hooks mounted on the links for positively removing the unclamped severed ends of the said strand sections upon pivoting of the pair of severing and clamping means toward the twisting hooks.

36. In combination, means for forming an intermediate part of a strand into a bight composed of two side-by-side portions and a connecting portion, rotatable hook means for engaging the bight adjacent the connecting portion for rotating the bight for simultaneously twisting each side by side portion of strand about the other to form a twisted loop, and means operable subsequent to the twisting for simultaneously cutting, clamping and removing the loop from the hook means.

LEE H. KAUPKE.
RUSSELL R. RANEY.

REFERENCES CITED

The following references are of record in the file of this patent:

UNITED STATES PATENTS

| Number | Name | Date |
|---|---|---|
| 889,815 | Schmid | June 2, 1908 |
| 914,182 | Pfeffer | Mar. 2, 1909 |
| 1,075,376 | Pearson et al. | Oct. 14, 1913 |
| 1,321,548 | Pearson | Nov. 11, 1919 |
| 1,673,125 | Robbins | June 12, 1928 |
| 1,681,245 | May et al. | Aug. 21, 1928 |
| 2,030,031 | Innes | Feb. 4, 1936 |
| 2,099,339 | Joley | Nov. 16, 1937 |
| 2,233,133 | Kennedy | Feb. 25, 1941 |
| 2,277,394 | Everhart et al. | Mar. 24, 1942 |
| 2,293,679 | Barker | Aug. 18, 1942 |

Certificate of Correction

Patent No. 2,446,878.                                                                                                August 10, 1948.

LEE H. KAUPKE ET AL.

It is hereby certified that errors appear in the printed specification of the above numbered patent requiring correction as follows: Column 13, line 30, claim 24, for the word "stand" read *strand*; line 39, claim 25, for "A baler," read *In a baler,*; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.* means operable subsequent to the twisting for simultaneously cutting, clamping and removing the loop from the hook means.

LEE H. KAUPKE.
RUSSELL R. RANEY.

REFERENCES CITED

The following references are of record in the file of this patent:

UNITED STATES PATENTS

| Number | Name | Date |
|---|---|---|
| 889,815 | Schmid | June 2, 1908 |
| 914,182 | Pfeffer | Mar. 2, 1909 |
| 1,075,376 | Pearson et al. | Oct. 14, 1913 |
| 1,321,548 | Pearson | Nov. 11, 1919 |
| 1,673,125 | Robbins | June 12, 1928 |
| 1,681,245 | May et al. | Aug. 21, 1928 |
| 2,030,031 | Innes | Feb. 4, 1936 |
| 2,099,339 | Joley | Nov. 16, 1937 |
| 2,233,133 | Kennedy | Feb. 25, 1941 |
| 2,277,394 | Everhart et al. | Mar. 24, 1942 |
| 2,293,679 | Barker | Aug. 18, 1942 |

Certificate of Correction

Patent No. 2,446,878.                                                                                             August 10, 1948.

LEE H. KAUPKE ET AL.

It is hereby certified that errors appear in the printed specification of the above numbered patent requiring correction as follows: Column 13, line 30, claim 24, for the word "stand" read *strand*; line 39, claim 25, for "A baler," read *In a baler,*; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*